US007088076B2

(12) United States Patent
Densham et al.

(10) Patent No.: US 7,088,076 B2
(45) Date of Patent: *Aug. 8, 2006

(54) POWER MANAGEMENT FOR BATTERY POWERED APPLIANCES

(75) Inventors: William L. Densham, Los Gatos, CA (US); Vlad Mihail Popescu-Stanesti, San Jose, CA (US); Constantin Spiridon, San Jose, CA (US)

(73) Assignee: O2Micro International Limited, Georgetown (KY)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 10/685,043

(22) Filed: Oct. 14, 2003

(65) Prior Publication Data

US 2004/0075418 A1 Apr. 22, 2004

Related U.S. Application Data

(63) Continuation of application No. 09/960,453, filed on Sep. 21, 2001, now Pat. No. 6,741,066.
(60) Provisional application No. 60/234,442, filed on Sep. 21, 2000.

(51) Int. Cl.
*H02J 7/04* (2006.01)

(52) U.S. Cl. ...................................... 320/145

(58) Field of Classification Search ................ 320/145, 320/141, 142, 143, 137, 164; 307/46, 48, 307/52, 60–66, 80; 702/62, 63
See application file for complete search history.

(56) References Cited

U.S. PATENT DOCUMENTS

| 5,504,454 | A |   | 4/1996  | Daggett et al. ............. 329/310 |
|-----------|---|---|---------|-------------------------------------|
| 5,572,110 | A |   | 11/1996 | Dunstan ..................... 320/106 |
| 5,684,382 | A |   | 11/1997 | Fritz et al. .................. 320/164 |
| 5,764,030 | A | * | 6/1998  | Gaza .......................... 320/116 |
| 5,819,087 | A | * | 10/1998 | Le et al. ........................ 713/2 |
| 6,144,187 | A | * | 11/2000 | Bryson ....................... 320/137 |
| 6,498,461 | B1|   | 12/2002 | Bucur ......................... 320/145 |
| 6,741,066 | B1| * | 5/2004  | Densham et al. ........... 320/145 |

FOREIGN PATENT DOCUMENTS

EP    1 447 897    8/2004

OTHER PUBLICATIONS

European Search Report dated Nov. 18, 2004.
Korean Office Action dated Nov. 25, 2005, from released Korean application (with English Translation) (4 pages).

* cited by examiner

*Primary Examiner*—Pia Tibbits
(74) *Attorney, Agent, or Firm*—Grossman, Tucker, Perreault & Pfleger, PLLC

(57) ABSTRACT

A power management topology for portable electronic devices that includes a feed-enabled AC/DC adapter that receives feedback data from a charge controller associated with the portable device. The feedback data can include battery charging current, battery voltage, or power requirements of the portable device. Using the feedback data, the external AC/DC adapter can adjust the DC output to meet the charging requirement of the battery and/or the power requirements of the portable device.

17 Claims, 4 Drawing Sheets

POWER MANAGEMENT FOR BATTERY POWERED APPLIANCES

This application is a continuation application under 37 CFR §1.53(b) of application Ser. No. 09/960,453 filed Sep. 21, 2001, now U.S. Pat. No. 6,741,066, which claims priority to U.S Provisional Application Ser. No. 60/234,442, filed Sep. 21, 2000, all of which are assigned to the same assignee and incorporated herein by reference.

BACKGROUND OF THE INVENTION

1. Field of the Invention

The present invention relates to power management for battery powered devices, and more particularly, to a power management topology that includes an external AC/DC adapter that is controlled by battery charge controller associated with a portable device.

2. Background Description

Present battery charging topologies are divided into two separate designs and implementation: AC adapters and battery charging topologies.

AC adapters have two present designs:

1) 60 Hz—Low cost transformers with full wave rectifiers and a filter capacitor. The windings of the transformer usually have high resistance that results in a quasi constant current source.

2) Hi Frequency—Promoted as the travel version of AC adapters with high frequency usually>100 KHz. As reactive impedance is a direct function of frequency ($Xl=2\pi f L$ and $Xc=\frac{1}{2}\pi f C$) for the same impedance L and C are smaller by the ratio of frequencies. For example the size of an inductor for 600,000 Hz vs 60 Hz is the ratio of 60/600,000 or 1/10,000=0.0001. These travel versions of AC adapters are designed with high frequency Switch Mode Power Supplies (SMPS). Hence the benefits are small size and light weight, highly valued by travelers, but may cost more than other types of adapters.

Most adapters in use today include PWM circuitry and controllers (including power switches and DC/DC converter circuitry such as Buck, flyback, boost, bridge, or other type of converter topology) to generate a regulated output.

Battery Chargers in systems like notebook computers, cellular phones and PDA's are generally used to control battery charging and/or power distribution to a system. Battery chargers generally have three popular designs:

1) Simple switched adapter charger uses a single electronic switch to directly connect the adapter to the battery. Then turning the switch off when the final charge voltage is reached. While relatively inexpensive, this type of charger circuitry must use a constant current AC Adapter generally the heavy, 60 Hz type. The battery charging algorithm is highly compromised, resulting in long charge times, perhaps never reaching full charge and limited ability to adapt to multiple battery chemistries like LiIon, NiMH and NiCd.

2) Linear regulators—Creation of a fixed output voltage is developed by dissipating excess input voltage within the regulating component. This usually results in efficiencies of 50% or less. The wasted power is dissipated within the regulator increasing the temperature within the small, tightly enclosed product. Additionally the wasted power significantly shortens the battery life which is of paramount importance to anyone carrying these products around. The only benefit for a consumer product with a dead battery is as an expensive piece of exercise equipment. The benefits of linear regulators are simplicity and low cost. The negatives include short battery life and high internal temperatures.

3) Switchmode Regulators—As described above, this method uses a switched mode power supply to efficiently (90 to 95%) convert the input voltage to the battery charge voltage. Optimum charging algorithms can be applied like constant current mode switching to constant voltage mode. Benefits of this type of design are rapid charging, high efficiency and adaptability to varying adapters and battery chemistries, but may cost more than linear regulators.

FIG. 1 depicts a conventional power management topology for a portable device. The system includes a portable device 10 that includes one or more batteries 30 and one or more active systems 18, 20, and/or 22 coupled to an AC/DC adapter 12. The adapter 12 operates to deliver controlled power to both charge the batteries and power any systems coupled thereto. A battery charger circuit 14 is provided to provide regulated power (voltage and/or current) to the battery 30 based on, for example, battery charging current, battery voltage, and/or available power from the adapter 12. Referring to FIG. 1A, a block diagram of a conventional battery charger circuit 14 is depicted. As is well understood in the art, the charger generally includes a plurality of error amplifiers 34 that monitor battery voltage and/or current and generate an error signal if the battery voltage and/or current exceed some predetermined threshold. Additionally, an error amplifier may be included to monitor input power availability and generate an error signal if the available power from the adapter 12 is exceeded. The charger 14 also includes a PWM generator and controller 36. The error signals generated by the error amplifiers are received by the controller 36 and operate to adjust the duty cycle of the PWM generator. The PWM signal is supplied to power switches and DC/DC converter 38 to generate a regulated DC source for charging the batteries.

Similarly, the AC/DC adapter 12 includes a PWM generator and controller, and further includes power switches and a DC/DC converter to provide a regulated output power source. Thus, a redundancy exists since both the adapter 12 and the charger 14 include a PWM generator and controller, power switches and a DC/DC converter.

SUMMARY OF THE INVENTION

Accordingly, the present invention provides a power management topology that includes an external AC/DC adapter that is controlled by battery charge controller. In the exemplary embodiments, the charge controller includes the error amplifiers to generate a feedback control signal, while the AC/DC adapter is modified to receive the control feedback signal to regulate the duty cycle of the PWM generator associated with the adapter. Thus, in the exemplary embodiments, the need for a PWM generator and controller, as well as power switches and a DC/DC converter are eliminated in the charger circuit, thereby economizing power topologies, as well as removing heat-generating portions of a conventional battery charger circuit to the external AC/DC adapter.

System exemplary embodiments include a power management topology for a portable electronic device, comprising a portable electronic device comprising a rechargeable battery and a charge controller comprising circuitry generating a feedback signal indicative of battery voltage and/or battery charging current. The topology also includes an external AC/DC adapter generating a DC source signal from an AC source, said adapter comprising a PWM generator generating a PWM signal and controller. The controller receives the feedback signal and adjusts the duty cycle of the PWM signal thereby adjusting the voltage and/or current value of the DC source signal.

In other exemplary embodiments, the present invention provides an AC/DC adapter comprising a PWM generator generating a PWM signal, a controller receiving a feedback signal generated by an external portable electronic device, and a DC/DC converter circuit generating a DC source signal. The controller adjusts the duty cycle of the PWM signal based on the feedback signal thereby adjusting the voltage and/or current value of the DC source signal.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
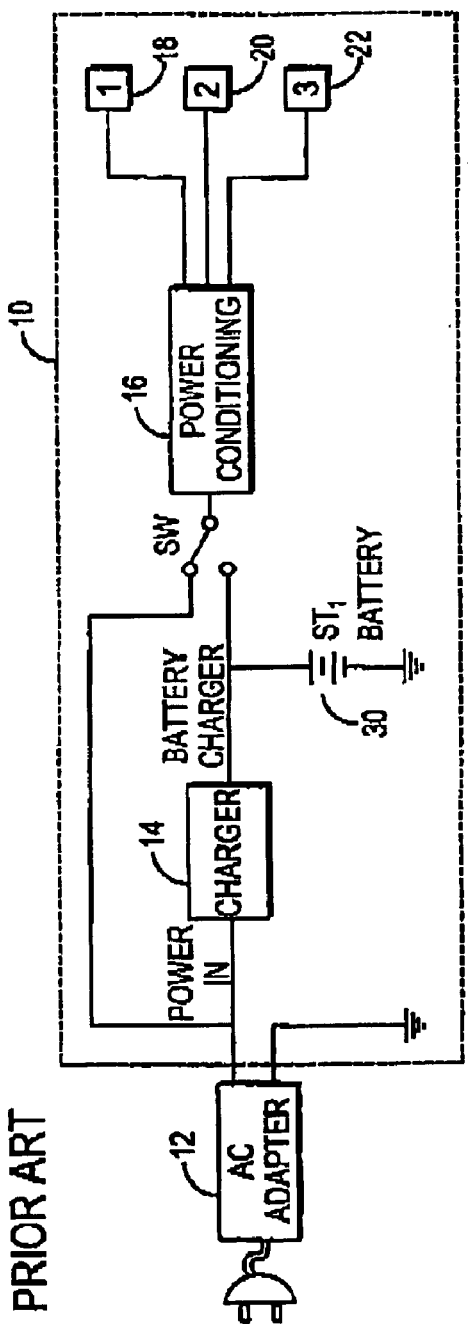
FIG. 1 is a block diagram of a conventional power management circuit.
Figure 2:
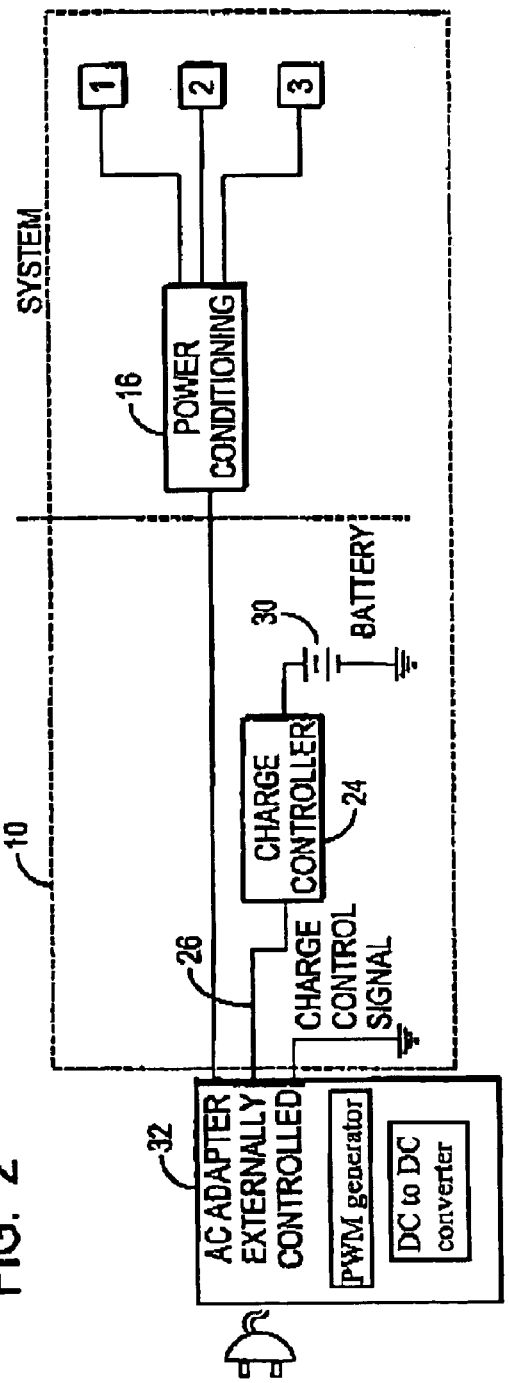
FIG. 2 is a block diagram of one exemplary of the power management topology of the present invention.
Figure 1A:
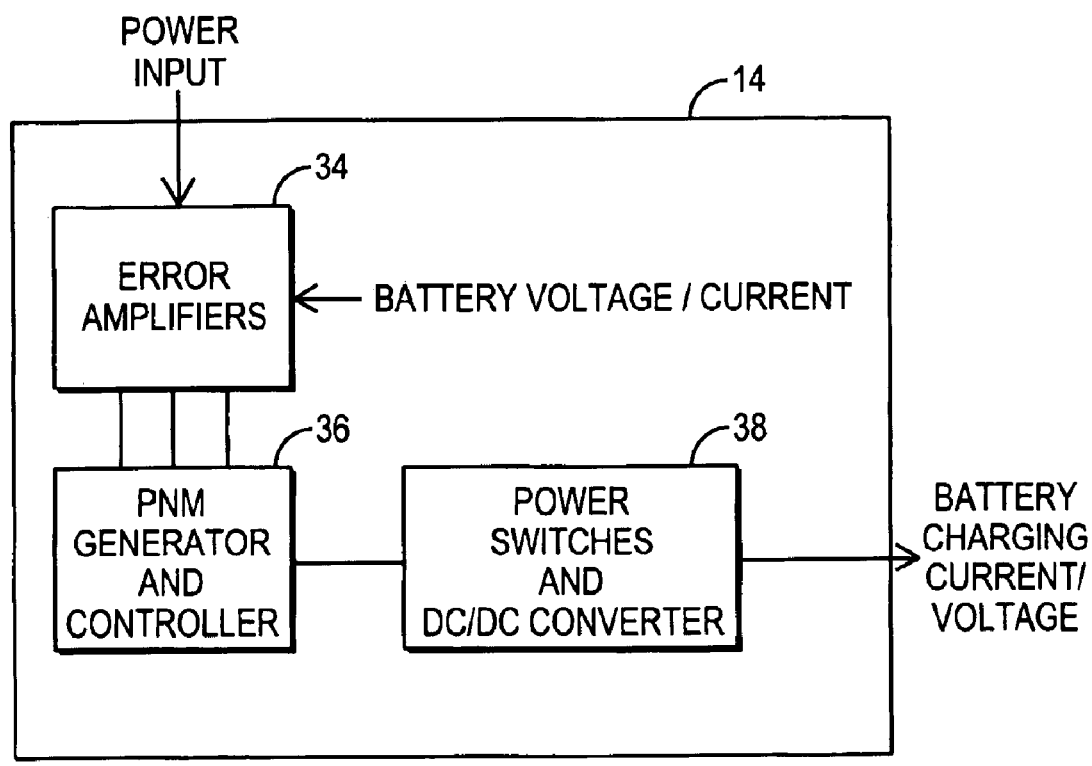
FIG. 1A is a block diagram of a conventional battery charger circuit.

FIG. 2 depicts a block diagram of an exemplary power management topology according to the present invention. As with the conventional power management topology of FIG. 1, the topology of FIG. 2 includes a system 10 powered by an AC/DC adapter 32. However, in this exemplary embodiment, the adapter 32 is feedback enabled to receive one or more feedback control signals generated by the error amplifiers associated with the charger. Thus, in this exemplary embodiment, it is only necessary for the charger to include error amplifiers, and is thus generalized as a charge controller 24. The charge controller 24 includes a plurality of error amplifiers that monitor battery voltage and/or current and generate an error signal if the battery voltage and/or current exceed some predetermined threshold. Additionally, an error amplifier may be included to monitor input power availability and generate an error signal based on the charging requirement of the battery balanced with the power requirement of the active system. These error signals are generally defined herein as feedback control signals 26, and are used to adjust the duty cycle of a PWM generator. One such battery charger topology is disclosed in U.S. application Ser. No. 09/948,828, entitled "Voltage Mode, High Accuracy Battery Charger", assigned to the same Assignee, and hereby incorporated by reference in its entirety. In the '09/948,828 application, feedback control signals are generated for battery voltage, battery charging current, and/or available power from the DC source to adjust the duty cycle of the PWM generator, thereby adjusting power delivered to the battery. Other charge topologies are well-known in the art, and all such battery charging circuits are deemed interchangeable and equivalent circuitry for the charge controller 24 of the present invention.

As set forth above, a conventional switched mode power supply (SWPS) AC/DC adapter includes PWM circuitry (generator and controller), power switches and DC/DC converter circuitry for generating a constant DC source. In the exemplary embodiment, the PWM controller of the AC/DC adapter is adapted to receive the feedback information generated by the charge controller 24 to adjust the DC output.

Figure 3A:
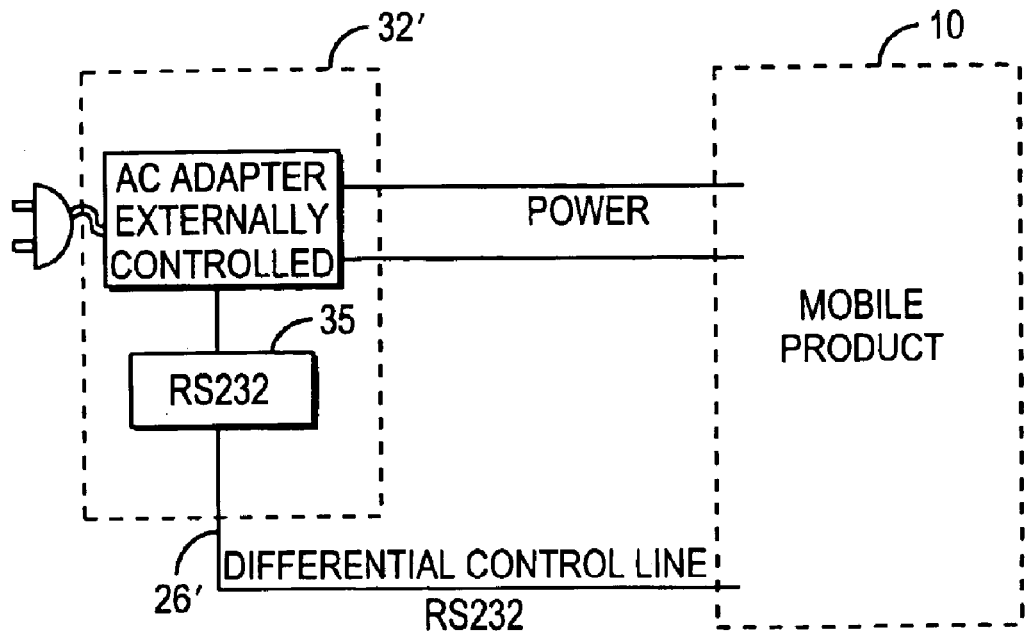
FIGS. 3A, 3B and 3C depict block diagrams of exemplary AC/DC adapter topologies according to the present invention.
Figure 3B:
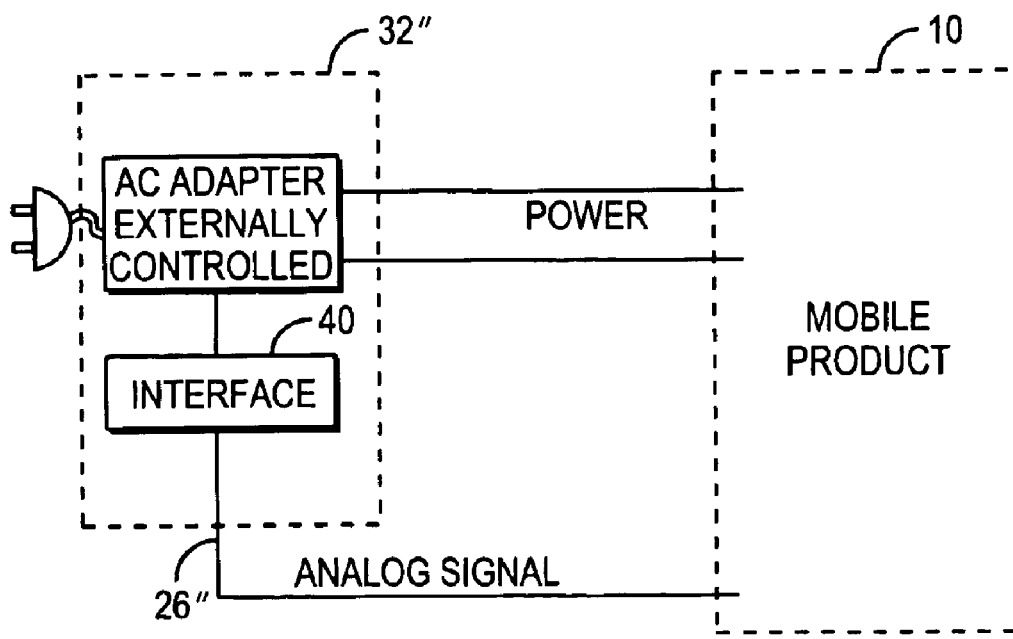
Figure 3C:
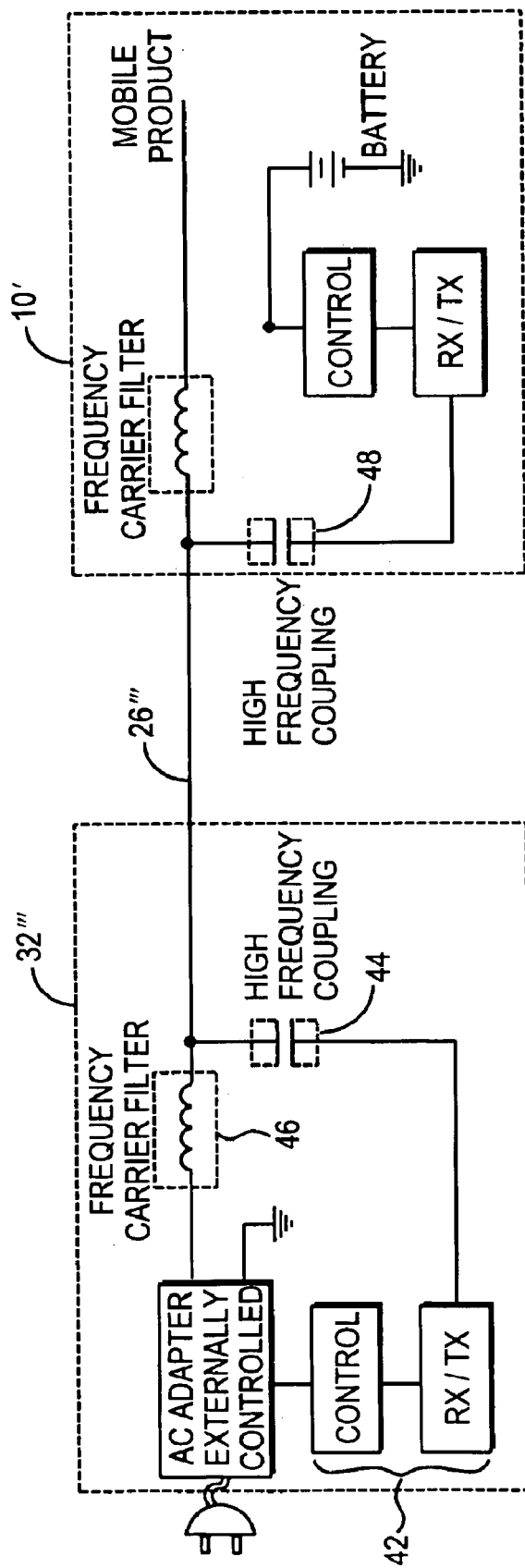

FIGS. 3A, 3B and 3C depict exemplary communication topologies to facilitate communication between the charge controller 24 associated with the portable system 10 and the adapter 32 of the present invention. In FIG. 3A, the adapter 32' is modified to include a serial communications interface 38 (e.g., RS232, RS434, Firewire, USB, etc.) to receive a serial control signal 26' generated by the charge controller. In this embodiment, the feedback control signal generated by the charge control is converted into serial communication data and forwarded to the adapter 32'. In FIG. 3B, the control signal 26" is an analog signal generated by the error amplifiers, and accordingly, an appropriate analog interface (e.g., buffer) may be provided in the adapter 32". FIG. 3C does not utilize a separate control signal line, but rather, modulates the feedback signal 26''' onto the power line. In this embodiment, both the adapter 32''' and system 10' are adapted with modulation/demodulation circuitry (42 and 44, respectively) to generate a feedback signal 26''' that is transposed on the power line.

Thus, the present invention provides power management topologies that obviate the need for power circuitry associated with a conventional battery charger circuit, and instead utilize the power circuitry already present in an AC/DC adapter to generate regulated controllable power to charge a battery and/or power a portable device. Advantageously, the costs of power switches and power dissipation within the appliance have been eliminated. The cost of an additional controller has been eliminated. Printed circuit board space has been saved within the appliance as there is no need for bulky power switches. Additionally, optimum charge algorithms can be implemented resulting in short battery charge times with full charge. Those skilled in the art will recognize numerous modifications to the present invention. These and all other modifications as may be apparent to one skilled in the art are deemed within the spirit and scope of the present invention, only as limited by the appended claims.

What is claimed is:

1. An adapter for providing an output DC signal, said adapter comprising:
a PWM generator and a DC to DC converter, said PWM generator generating a PWM signal in response to receipt of an analog feedback signal from one of a plurality of error amplifiers of a charge controller of an external device, said analog feedback signal representative of a power condition of said external device, said DC to DC converter configured to receive said PWM signal and adjust said output DC signal in response to said PWM signal.

2. The adapter of claim 1, wherein said PWM generator adjusts a duty cycle of said PWM signal in response to said analog feedback signal.

3. The adapter of claim 1, wherein said power condition of said external device is a power condition of a battery of said external device.

4. The adapter of claim 3, wherein said power condition of said battery is a battery voltage level.

5. The adapter of claim 3, wherein said power condition of said battery is a battery charging current level.

6. The adapter of claim 1, wherein said power condition of said external device is a power requirement of at least one active system of said external device.

7. An electronic device comprising:
a charge controller comprising a plurality of error amplifiers, each one of said plurality of error amplifiers capable of generating an analog feedback signal feedback signal representative of a power condition of said electronic device, wherein an adapter comprises a PWM generator generating a PWM signal in response to receipt of any one of said analog feedback signal to adjust an output DC signal from said adapter.

8. The electronic device of claim 7, further comprising a rechargeable battery and wherein said charge controller provides said output DC signal from said adapter to said rechargeable battery in a battery charging supply mode.

9. The electronic device of claim 7, wherein said power condition of said external device is a power condition of a rechargeable battery of said external device.

10. The electronic device of claim 9, wherein said power condition of said rechargeable battery is a battery voltage level.

11. The electronic device of claim 9, wherein said power condition of said rechargeable battery is a battery charging current level.

12. The electronic device of claim 7, wherein said power condition of said external device is a power requirement of at least one active system of of said electronic device.

13. A method of adjusting of DC power signal from an adapter, said method comprising:

monitoring a power condition of an external device coupled to said adapter;

providing an analog feedback signal from one of a plurality of error amplifiers of a charge controller of said external device to said adapter representative of said power condition of said external device;

adjusting a PWM signal generated by said adapter in response to said analog feedback signal received by said adapter; and adjusting said DC power signal provided by said adapter in response to said PWM signal.

14. The method of claim 13, wherein said power condition of said external device is a power condition of a rechargeable battery of said external device.

15. The method of claim 14, wherein said power condition of said rechargeable battery is a battery voltage level.

16. The method of claim 14, wherein said power condition of said rechargeable battery is a battery charging current level.

17. The method of claim 13, wherein said power condition of said external device is a power requirement of a t least one active system of said external device.

* * * * *